US006727934B2

(12) United States Patent
Suda

(10) Patent No.: US 6,727,934 B2
(45) Date of Patent: Apr. 27, 2004

(54) SEMICONDUCTOR LASER DRIVING APPARATUS AND LASER SCANNER

(75) Inventor: Tadaaki Suda, Saitama (JP)

(73) Assignee: PENTAX Corporation, Tokyo (JP)

(*) Notice: Subject to any disclaimer, the term of this patent is extended or adjusted under 35 U.S.C. 154(b) by 0 days.

(21) Appl. No.: 10/157,128

(22) Filed: May 30, 2002

(65) Prior Publication Data

US 2002/0180862 A1 Dec. 5, 2002

(30) Foreign Application Priority Data

May 31, 2001 (JP) .................................... P2001-163798

(51) Int. Cl.[7] ............................ B41J 2/47; B41J 4/435; H01S 3/00

(52) U.S. Cl. ...................................................... 347/247

(58) Field of Search ................................ 347/247, 251, 347/252, 253, 255, 224, 233, 237, 238, 239, 240, 241, 243, 244, 256, 258, 259, 260, 261; 399/4, 5, 7, 151

(56) References Cited

U.S. PATENT DOCUMENTS 4,520,295 A * 5/1985 Bolhuis

* cited by examiner

*Primary Examiner*—Raquel Yvette Gordon
(74) *Attorney, Agent, or Firm*—Greenblum & Bernstein, P.L.C.

(57) ABSTRACT

A semiconductor laser driving apparatus has a laser diode that emits a laser beam, a laser driving circuit that drives the laser diode by feeding a driving current in pulses to the laser diode, a conductor that conducts the driving current from the laser driving circuit to the laser diode, and an inductance adjuster that has a conductor-pattern for conducting the driving current and adjusting the magnitude of inductance in the conductor. A part of the conductor-pattern that makes the magnitude of the inductance a proper magnitude for emitting the laser beam in generally rectangular pulses, is selectively defined and conducts the driving current as a part of the conductor.

22 Claims, 9 Drawing Sheets

SEMICONDUCTOR LASER DRIVING APPARATUS AND LASER SCANNER

BACKGROUND OF THE INVENTION

1. Field of the Invention

The present invention relates to a semiconductor laser driving apparatus, which drives a semiconductor laser (laser diode), and a laser scanner including the semiconductor laser driving apparatus. Especially, the present invention relates to a driving control of the semiconductor laser for the scanning.

2. Description of the Related Art

A laser scanner including a semiconductor laser, which is incorporated in a laser printer, an electronic photograph system and so on, performs scanning by controlling the emission of laser beams, whereby a printing or copying is performed. When a pulsed driving current is fed to the laser diode in accordance with pattern-forming data, the laser beam is emitted from the laser diode at a given timing. The laser beam is deflected by an optical system for scanning, so that a photosensitive body, such as a photosensitive drum, is scanned and a design pattern is formed on the photosensitive body. In recent years, various laser diodes, having different wavelength, have been developed, and a laser diode with suitable characteristics for the photosensitive body is selected and used.

The response characteristics of the laser diode to the pulsed driving current, namely, the characteristics of the output pulse of the laser beam, are different for each laser diode. Especially, in the case of a laser diode with a wavelength in the vicinity of ultraviolet rays, a phenomena where there is a rise in light-emission delay time, occurs when the driving current is supplied. This phenomenon causes a lack of exposure of one-dot on the photosensitive body.

In recent years, scanning at higher speeds has been required, and the exposure time for one-dot has become even shorter. Especially, when performing a half-gray printing at high speed, a minute adjustment of the exposure is required. In the case of printing at high speed, the rate at which the driving current is switched ON and OFF has become much higher, and disturbance of the driving current occurs in the transient state. A remarkable decrease in density occurs because of the delay in the light-emission, so that the quality of the image output from the electronic photograph system or the quality of the printed image degrades.

SUMMARY OF THE INVENTION

Therefore, an object of the present invention is to provide a semiconductor laser driving apparatus and a laser scanner that are capable of properly controlling the emission of the laser beam in a scanning operation.

A semiconductor laser driving apparatus of the present invention is incorporated in a laser printer, an electronic photograph system such as a digital copy machine, and so on. The semiconductor laser driving apparatus has a laser diode, a laser driving circuit, a conductor, and an inductance adjuster. The laser diode, namely, the semiconductor diode, emits a laser beam. The laser driving circuit drives the laser diode by feeding a driving current in pulses to the laser diode. Thus, the laser diode emits the laser beam in pulses. The conductor conducts the driving current from the laser driving circuit to the laser diode. The inductance adjuster has a conductor-pattern for conducting the driving current and adjusting the magnitude of inductance in the conductor.

According to the present invention, a part of the conductor-pattern is selectively defined from the total of the conductor-pattern in accordance with the utilized laser diode. The defined part of the conductor-pattern conducts the driving current as a part of the conductor. The defined part of the conductor-pattern makes the magnitude of inductance a proper magnitude, which enables the laser beam to be emitted in generally rectangular pulses. Especially, the part of the conductor-pattern is selectively defined such that an output pulse of the laser beam takes on a generally rectangular form at a rising time.

When increasing the magnitude of inductance, a remarkable amount of so called "over shoot" occurs in the driving current due to the high frequency of the driving current pulses. In the present invention, a waveform of the output pulse of the laser beam is adjusted by utilizing the "overshoot", namely, the increase of the magnitude of inductance.

Since the magnitude of inductance can be adjusted to a magnitude suitable for the response characteristics of the incorporated laser diode (in other words, the output pulse characteristics of the laser beam), a lack of exposure does not occur even when printing and copying at high speed, so that high-quality images are obtained for every laser diode.

For example, when the laser diode and the laser driving circuit are provided on a printed circuit board, then the conductor is a wire that is formed on the printed circuit board, and the conductor-pattern is a wire-pattern that is formed on the printed circuit board. In this case, the inductance adjuster is formed on the printed circuit board during the manufacturing process. When the laser diode is exchanged, the magnitude of inductance is adjusted in accordance with the response characteristics of the newly incorporated laser diode. Then, a part of the wire-pattern, which is selected from the total of the wire-pattern, conducts the driving current as a part of the wire.

Preferably, the wire-pattern is formed in such a manner that the total-length of the wire varies in accordance with the selection of the part of the wire-pattern. Further, the wire-pattern is formed in such a manner that the width of the wire varies in accordance with the selection of the part of the wire-pattern.

A laser scanner of the present invention has a laser diode that emits a laser beam, a laser driving circuit that drives the laser diode by feeding a driving current in pulses to the laser diode, the laser diode emitting the laser beam in pulses, a conductor that conducts the driving current from the laser driving circuit to the laser diode, an inductance adjuster that has a conductor-pattern for conducting the driving current and adjusting the magnitude of inductance in the conductor, and a scanning optical system that deflects the laser beam and directs the laser beam to a photosensitive body for scanning. Then, a part of the conductor-pattern that makes the magnitude of inductance a proper magnitude for emitting the laser beam in generally rectangular pulses, is selectively defined and conducts the driving current as a part of the conductor.

A semiconductor laser driving apparatus according to another aspect of the present invention has a laser diode that emits a laser beam, a laser driving circuit that drives the laser diode by feeding a driving current in pulses to the laser diode so that the laser diode emits the laser beam in pulses, a conductor that conducts the driving current from the laser driving circuit to the laser diode, and an impedance adjuster that has a conductor-pattern for conducting the driving current and adjusting the magnitude of impedance in the conductor. Then, part of the conductor-pattern that makes the magnitude of impedance a proper magnitude for emitting the laser beam in generally rectangular pulses, is selectively defined and conducts the driving current as a part of the conductor.

The impedance is adjusted by changing the total-length of the wire, namely, by changing the magnitude of inductance, or, the impedance is adjusted by changing the width of the wire, namely, by changing the magnitude of resistance.

The "impedance" and "inductance", described above, indicate impedance and inductance during the transient state that occurs in the circuit because of the driving current. Note that, the transient state occurs when the driving current for the laser diode is switched ON and OFF at high speed.

BRIEF DESCRIPTION OF THE DRAWINGS

The present invention will be better understood from the description of the preferred embodiments of the invention set fourth below together with the accompanying drawings, in which.

DESCRIPTION OF THE PREFERRED EMBODIMENTS

Hereinafter, the preferred embodiments of the present invention are described with reference to the attached drawings.

Figure 1:
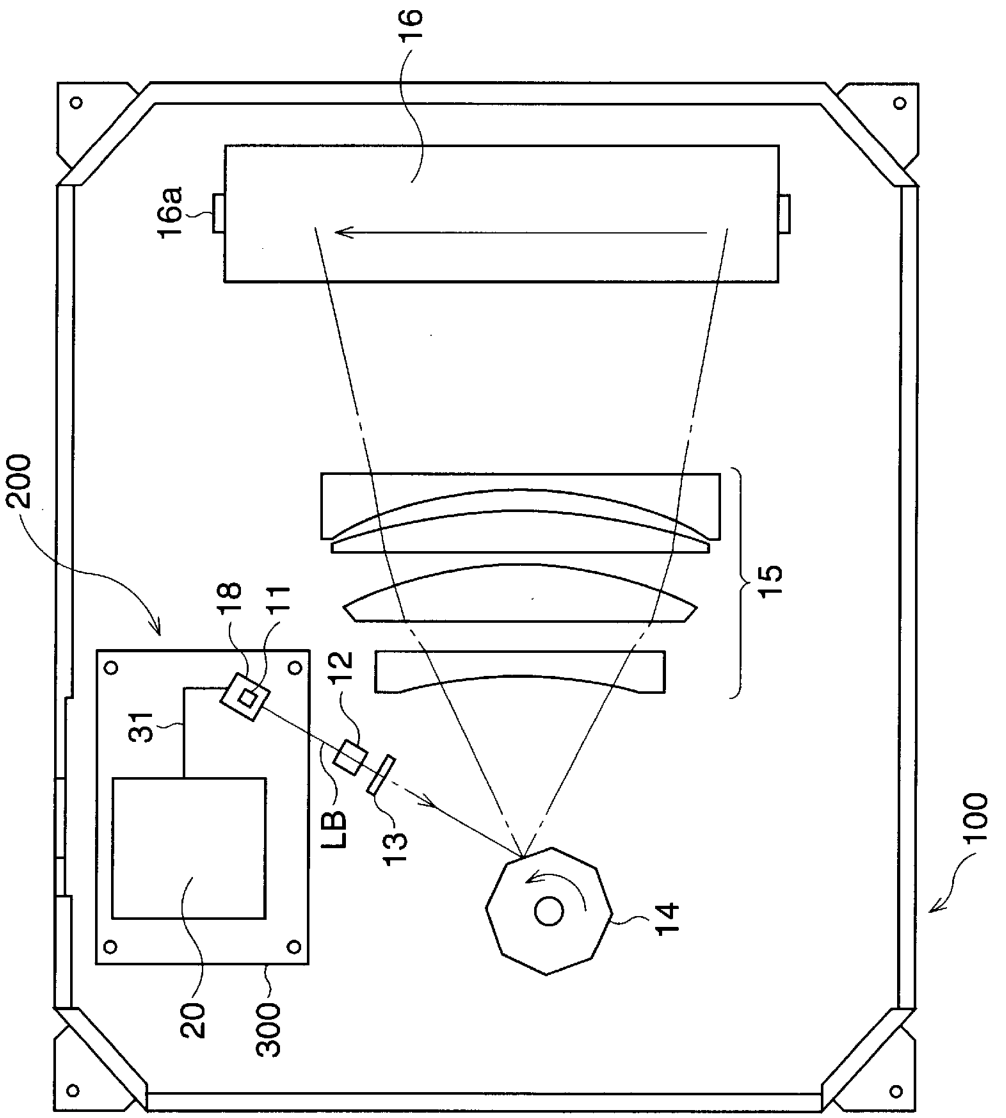
FIG. 1 is a schematic plan view of a laser scanner with a semiconductor laser driving apparatus according to the first embodiment.

FIG. 1 is a schematic plan view of a laser scanner with a semiconductor laser driving apparatus according to a first embodiment. In this embodiment, the laser scanner is utilized in a laser printer.

The laser scanner 100 has a package 18 with a laser diode 11, which is a semiconductor, and further has a collimator lens 12, a cylindrical lens 13, a polygon mirror 14, an f-θ lens 15, and a photosensitive drum 16. The laser diode 11 as a light source emits a laser beam LB, which becomes a parallel beam by using the collimator lens 12. The laser beam LB passes through the cylindrical lens 13, and is reflected on the polygon mirror 14 so that the laser beam LB is deflected toward a photosensitive drum 16. The deflected laser beam LB passes through the f-θ lens 15 and reaches a given position on the drum 16. The polygon mirror 14 revolves so that the photosensitive drum 16 is scanned along a horizontal scanning direction. The photosensitive drum 16 has a rotating shaft 16*a* extending along the horizontal scanning direction, which rotates the photosensitive drum 16 around the rotating shaft 16*a*. Thus, the photosensitive drum 16 is scanned along a direction perpendicular to the horizontal scanning direction.

A semiconductor laser driving apparatus 200, provided in the laser scanner 100, has a laser driving circuit 20 for driving the laser diode 11. The laser diode 11 and the laser driving circuit 20 are provided on a PCB (Printed Circuit Board) 300, and a wire 31 is formed between the laser diode 11 and the laser driving circuit 20. The laser beam LB is modulated by the laser driving circuit 20, so that a predetermined printing-pattern is formed on the photosensitive drum 16.

Figure 2:
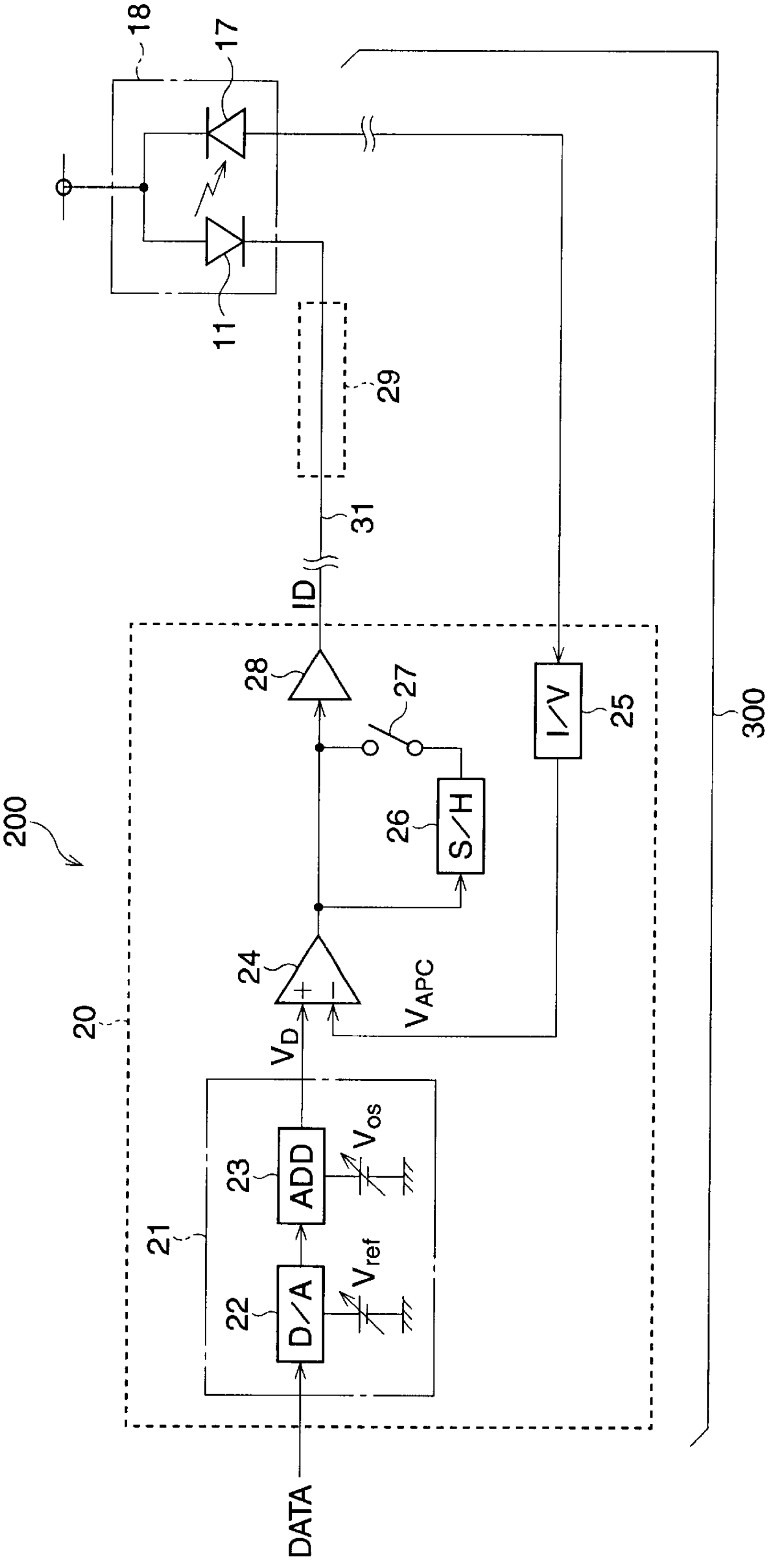
FIG. 2 is a block diagram of the semiconductor laser driving apparatus.

FIG. 2 is a block diagram of the semiconductor laser driving apparatus 200.

The laser driving circuit 20 feeds driving current pulses to the laser diode 11 and controls the flow of the driving current in accordance with pattern-data, which is fed from a peripheral device (not shown). A level adjuster 21 has a D/A converter 22, which converts input digital signals to analog signals and adjusts the white level in accordance with a standard voltage $V_{ref}$, and an adder 23, which adjusts a black level by adding a voltage $V_{os}$ to the voltage of the input signals. The level adjuster 21 outputs a voltage signal VD, which is input to a comparator 24.

A photodiode 17 for detecting the intensity of a laser beam LB is provided in the package 18 in addition to the laser diode 11, the laser diode 11 and the photodiode 17 being incorporated in the package 18. When the intensity of the laser beam LB is detected by the photodiode 17, and current corresponding to the amount of the laser beam LB is fed from the photodiode 17 to an I/V converter 25, wherein the current is transformed to an APC voltage signal $V_{apc}$ and the APC voltage signal $V_{apc}$ is output to the comparator 24. The voltage signal $V_D$ is compared to the APC voltage $V_{aps}$ at the comparator 24, and the level of voltage signal $V_D$ is adjusted in accordance with the difference between the voltage signal $V_D$ and the AP voltage signal $V_{apc}$.

The voltage signal $V_D$ is sampled and held at a S/H (sample/hold) circuit 26. A timing switch 27 is turned from ON to OFF and vice versa by a control signal fed from a control circuit (not shown). The sampled and held voltage signal $V_D$ is output from the S/H circuit 26 by turning the timing switch 27 ON or OFF. The output voltage signal $V_D$ is output from the S/H circuit 26 as a voltage signal corresponding to one-dot. The output voltage $V_D$ from the S/H circuit 26 is converted to a driving current ID at a buffer 28, and the driving current ID is fed to the laser diode 11 via an inductance adjuster 29. As described later, the inductance adjuster 29 is provided for adjusting the magnitude of inductance, in other words, the magnitude of impedance. The driving current ID flows in pulses in accordance with the changing of the timing switch 27.

Figure 3A:
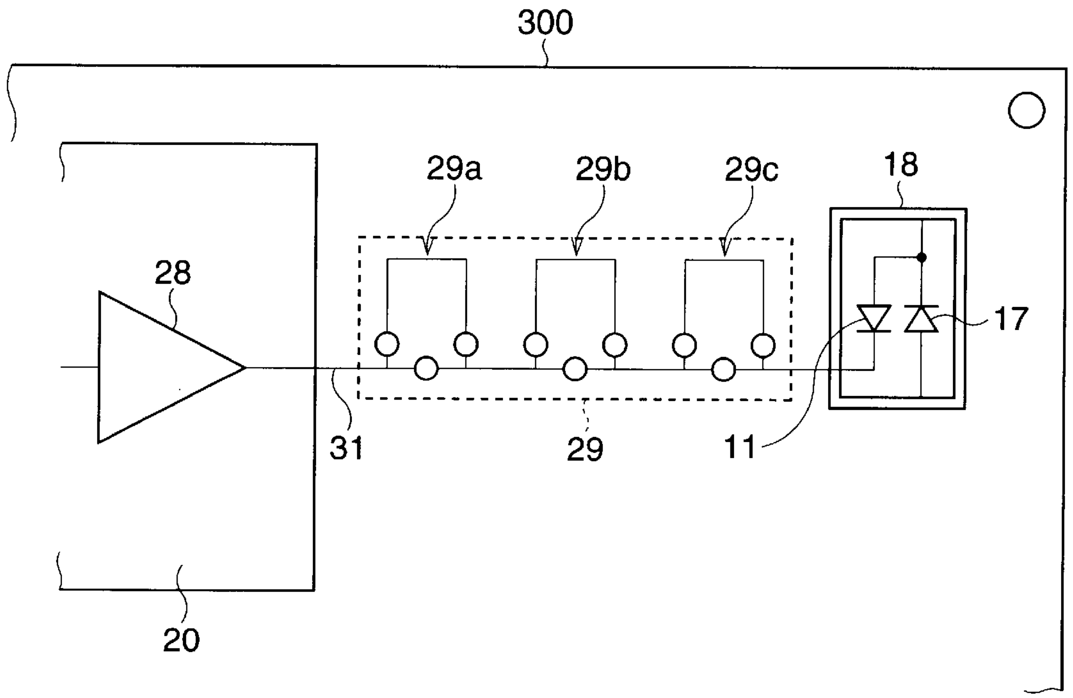
FIGS. 3*a* and 3*b* are views showing the inductance adjuster on the printed circuit board.
Figure 3B:
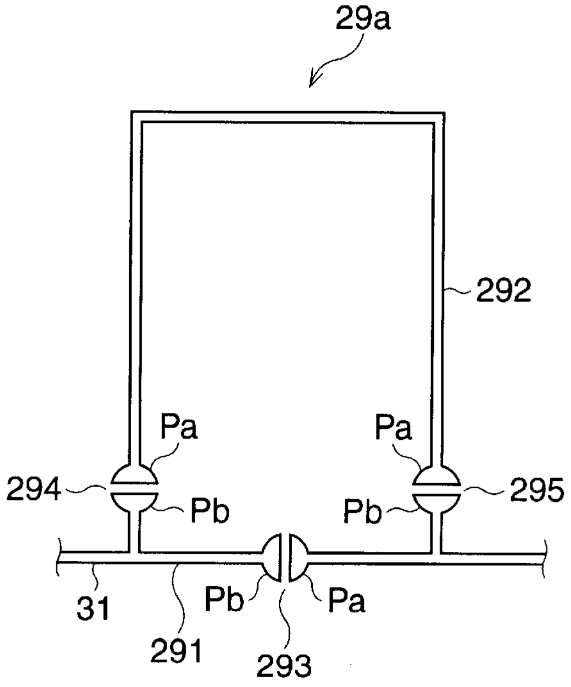

FIG. 3*a* is a view showing the inductance adjuster 29 on the PCB 300. FIG. 3*b*is a view showing one inductance adjusting wire pattern element.

The laser driving circuit 20 composed of a wire-pattern is formed on the PCB 300, and the package 18 is mounted on the PCB 300. The wire 31 formed on the PCB 300 is composed of copper foil, and extends in a straight line from the buffer 28 to the laser diode 11.

The inductance adjuster 29, which is constructed of a wire-pattern and functions as a part of the wire 31, is formed on the PCB 300 between the laser driving circuit 20 and the laser diode 11. The inductance adjuster 29 has first, second, and third inductance selecting wire pattern elements 29*a*, 29*b*, and 29*c*, and each of the inductance adjusting wire pattern elements 29*a*, 29*b*, and 29*c* is formed in a rectangular frame shape and is composed of a low-inductance wire portion 291 and a bypass wire portion 292. The rectangular shaped bypass wire portion 292 is coupled between the opposite sides of the low-inductance wire portion 291, and makes a detour round the low-inductance wire portion 291.

As shown in FIG. 3*b*, which shows the first inductance selecting wire pattern element 29*a*, a land 293 composed of a pair of semicircle-shaped bonding pads Pa and Pb, is provided at the low-inductance wire portion, whereas a pair of lands 294 and 295, each of which is composed of a pair of bonding pads Pa and Pb, is provided at the bypass wire-portion 292. Each of the lands 293, 294, and 295 corresponds to a terminal area, and the pair of lands 294 and 295 is formed adjacent to the low-inductance wire portion 291. The bypass wire portions 292 in the inductance selecting wire pattern elements 29*b* and 29*c* are similar to the bypass wire portion 292 in the inductance selecting wire pattern element 29*a* with respect to the total-length and form. The bonding pads Pa and Pb are opposite to each other and cut the electrical connection between the laser driving circuit 20 and the laser diode 11. Hereinafter, the land 293 is designated as a "low-inductance land", and the pair of lands 294 and 295 are designated as a "the pair of bypass lands".

Figure 4A:
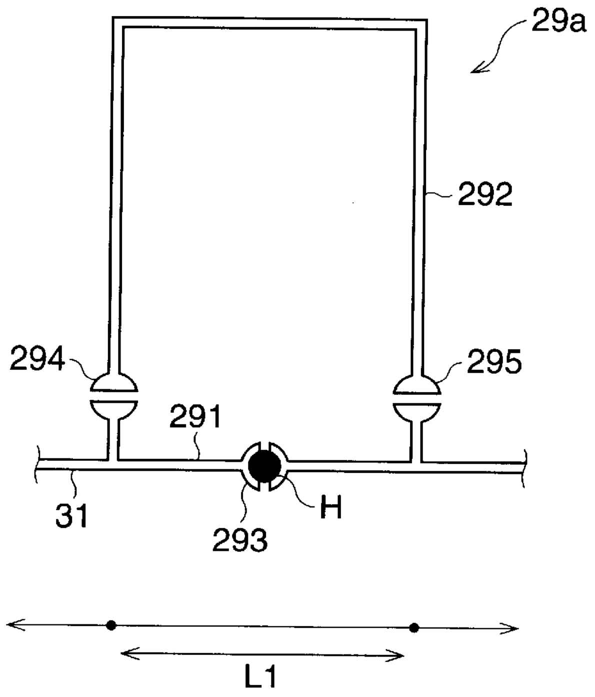
FIGS. 4*a* and 4*b* are views showing the first inductance selecting wire pattern elements.
Figure 4B:
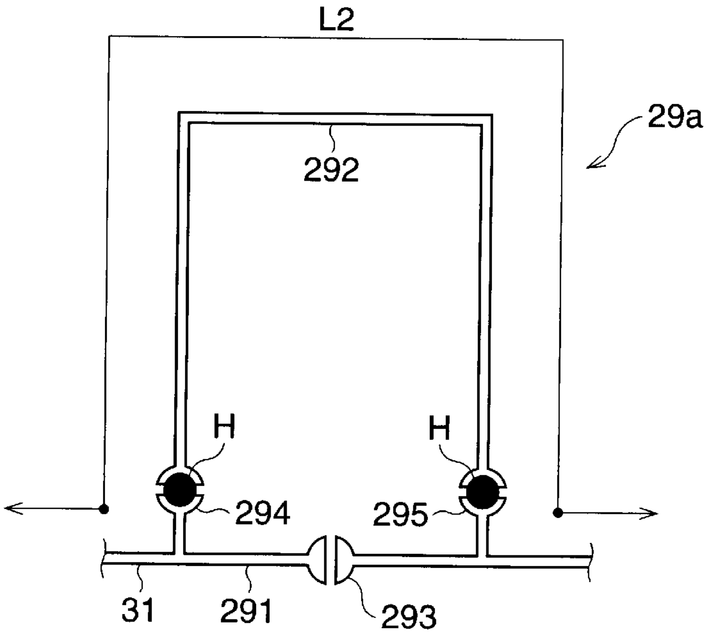

FIG. 4*a* is a view showing the first inductance selecting wire pattern element 29*a*, in which the low-inductance land 293 is shorted. FIG. 4*b* is a view showing the inductance selecting wire pattern element 29*a*, in which the pair of bypass lands 294 and 295 are shorted respectively.

In this embodiment, in each of the inductance selecting wire pattern elements 29*a*, 29*b*, and 29*c*, the low-inductance wire portion 291 or the bypass wire portion 292 is selected as a part of the wire 31, and the low-inductance land 293 or the pair of bypass lands 294 and 295 are shorted to electrically connect the laser driving circuit 20 with the laser diode 11. The low-inductance land 293 or the pair of bypass lands 294 and 295 are electrically connected by soldering the pair of bonding pads Pa and Pb, namely, by dropping soft solder H on the pair of bonding pads Pa and Pb.

When the low-inductance wire portion 291 is selected and the low-inductance land 293 is shorted, the wire-length of the inductance selecting wire pattern element 29*a* is "L1" (See FIG. 4*a*). On the other hand, when the bypass wire portion 292 is selected and the pair of bypass lands 294 and 295 are shorted, the wire-length of the inductance selecting wire pattern elements 29*a* is "L2" (See FIG. 4*b*). Accordingly, the total-length of the wire 31 varies with the combination of selections of wire portions in the first, second, and third inductance selecting wire pattern elements 29*a*, 29*b*, and 29*c*.

To explain the difference of the wire-length, the total-length of the wire 31 (in condition that the three low-inductance wire portions 291 are selected for the first, second and third wire pattern elements 29*a*, 29*b*, and 29*c*) is herein designated as a "base-length". When two low-inductance wire portions 291 and one bypass wire portion are selected for the first, second, and third inductance selecting wire pattern elements 29*a*, 29*b*, and 29*c*, the total-length of the wire 31 becomes longer compared to the base-length by "L2–L1". When one low-inductance wire portion 291 and two bypass wire portions 292 are selected, the total-length of the wire 31 becomes longer compared to the base-length by "2(L2–L1)". When three bypass wire portions 292 are selected, the total-length of the wire 31 becomes longer compared to the base-length by "3(L2–L1)".

In this embodiment, a wire-path is defined from the wire-pattern of the inductance adjuster 29 as a part of the wire 31. At this time, one total-length of the wire 31 is selected from the four total-lengths described above.

With reference to FIGS. 5*a* to 5*e*, a response characteristic of the laser diode 11 is explained.

Figure 5A:
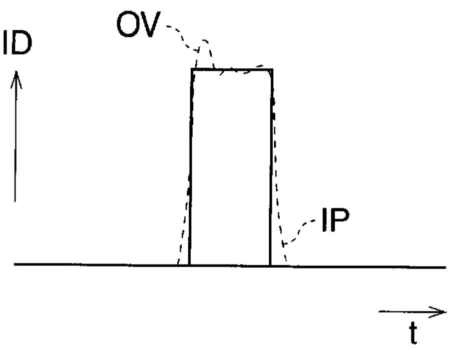
FIGS. 5*a* to 5*e* are views showing driving current pulses and the response characteristics of the laser diode.

FIG. 5*a* is a view showing the driving current $I_D$ output from the laser driving circuit 20, which is represented as a pulse signal corresponding to one dot. The horizontal axis indicates the time, whereas the vertical axis indicates the level of the driving current. The practice driving current pulse is represented by a broken line IP, in which so called "overshoot" OV occurs at the rising time. Note that, in this embodiment, the laser diode 11 emits light with wavelength in the vicinity of ultraviolet rays.

Figure 5B:
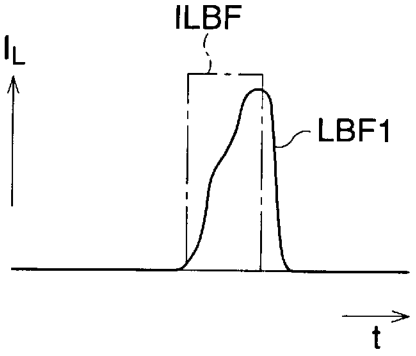

FIG. 5*b* is a view showing the response characteristics of the laser diode 11 in the condition that the three low-inductance wire portions 291 are selected for the first, second and third inductance selecting wire pattern elements 29*a*, 29*b*, and 29*c*. The magnitude of inductance for the wire 31 varies with the total-length of the wire 31, and generally increases in proportion to the total-length. Accordingly, in this case, the magnitude of inductance is smallest. The response characteristics of the laser diode 11 indicate the output pulse characteristics of the laser beam LB when the driving current pulse corresponding to one-dot is fed. In FIG. 5*b*, the horizontal axis indicates the time, whereas the vertical axis indicates intensity $I_L$ of the laser beam LB, namely, the amount of laser beam LB. The ideal laser beam LB is emitted in a pulse, which is represented by one doted chain line ILBF, and the practice laser beam LB is represented by solid line LBF1. As shown in FIG. 5*b*, the phenomena where a rise in the light-emission delay time at the rising time, occurs.

Figure 5C:
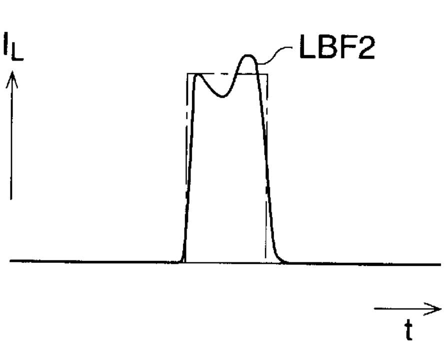

FIG. 5*c* is a view showing the response characteristics of the laser diode 11 in the condition where one bypass wire portion 292 and two low-inductance wire portions 291 are selected for the first, second, and third inductance selecting wire pattern elements 29*a*, 29*b*, and 29*c*. In this case, the magnitude of the inductance increases compared to the magnitude of the inductance corresponding to the base-length of the wire 31. Namely, the magnitude of impedance increases by lengthening the total-length of the wire 31. As the driving current pulse is a high-frequency pulse, considerable overshoot OV occurs in the rising time. Consequently, the rising of the output pulse is improved, namely, the output pulse of the laser beam LB generally becomes a rectangular pulse, as shown by solid line LBF2.

Figure 5D:
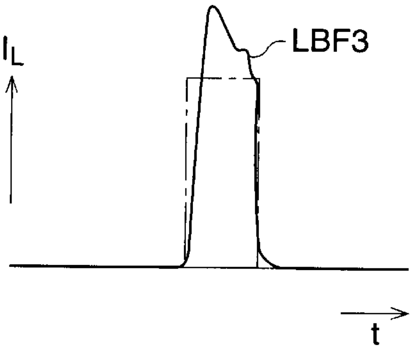

FIG. 5*d* is a view showing the response characteristics of the laser diode 11 in the condition where one low-inductance wire portion 291 and two bypass wire portions are selected for the first, second, and third inductance selecting wire pattern elements 29*a*, 29*b*, and 29*c*. The magnitude of the inductance further increases, so that remarkable overshoot OV in the driving current pulse occurs at the rising time. Consequently, the intensity $I_L$ of the laser beam LB exceeds the rated intensity of the output pulse, as shown by solid line LBF3.

Figure 5E:
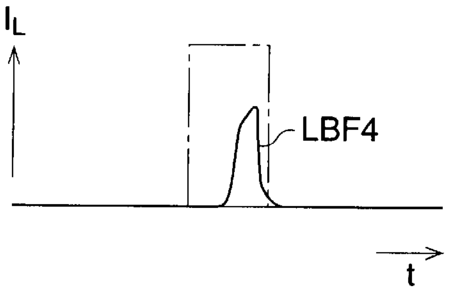

FIG. 5*e* is a view showing the response characteristics of the laser diode 11 in the condition where the three bypass wire portions 292 are selected for the first, second, and third inductance selecting wire pattern elements 29*a*, 29*b*, and 29*c*. In this case, the magnitude of inductance becomes too large, so that the intensity $I_L$ of the laser beam LB decreases, as shown by solid line LBF4.

The response characteristics of the laser diode 11 were measured for each of the four magnitudes of inductance, after soldering the respective connections in order. Then, one bypass wire portion 292 and two low-inductance wire portions 291 were selected in this embodiment. Thus, the output pulse of the laser beam LB becomes generally rectangular, as shown in FIG. 5*c*.

Note that, the pair of lands 294 and 295 are formed adjacent to the low-inductance wire portion 293 s0 that the magnitude of inductance does not vary due to the length of the unselected bypass wire portion 292 when the low-inductance wire portion 291 is selected.

In this way, in the first embodiment, the inductance adjuster 29 having the first, second, and third inductance selecting wire pattern elements 29*a*, 29*b*, and 29*c*, is formed on the PCB 300 in advance, and the bypass wire portion 292 or the low-inductance wire portion 291 is selected for each of the first, second, and third inductance selecting wire pattern elements 29*a*, 29*b*, and 29*c*. Namely, either the land 293 or the pair of lands 294 and 295 is selected, and shorted by soldering each of the first, second, and third inductance selecting wire pattern elements 29*a*, 29*b*, and 29*c*. Thus, a part of the wire pattern in the inductance adjuster 29 is defined as the part of the wire 31. The total-length of wire 31 varies in accordance with the selection of the wire-path for conducting the driving current, and the magnitude of inductance, namely, the magnitude of impedance varies with the total-length of wire 31. The wire-path of the wire 31 is selectively defined such that the magnitude of inductance becomes a proper magnitude as shown in FIG. 5*c*.

In this embodiment, the laser diode 11 emits light with a wavelength in the vicinity of ultraviolet rays, however, the selection of the wire-path and soldering may be performed in accordance with the response characteristics of the incorporated laser diode.

Note that, the number of inductance selecting wire pattern elements may be more than three. Further, the wire-length of the bypass wire portion in each inductance selecting wire pattern element may be shorter to minutely adjust the magnitude of inductance. Further, the inductance adjuster 29 and wire 31 may be constructed of a conductor composed of conductive materials in place of wires.

The low-inductance lands 293 and the pair of bypass lands 294 and 295 may be shorted by dropping conductive bonds in place of soldering. Further, a hall (a so called "through-hall") may be formed in the PCB 300 in place of the pair of pads Pa and Pb.

Figure 6:
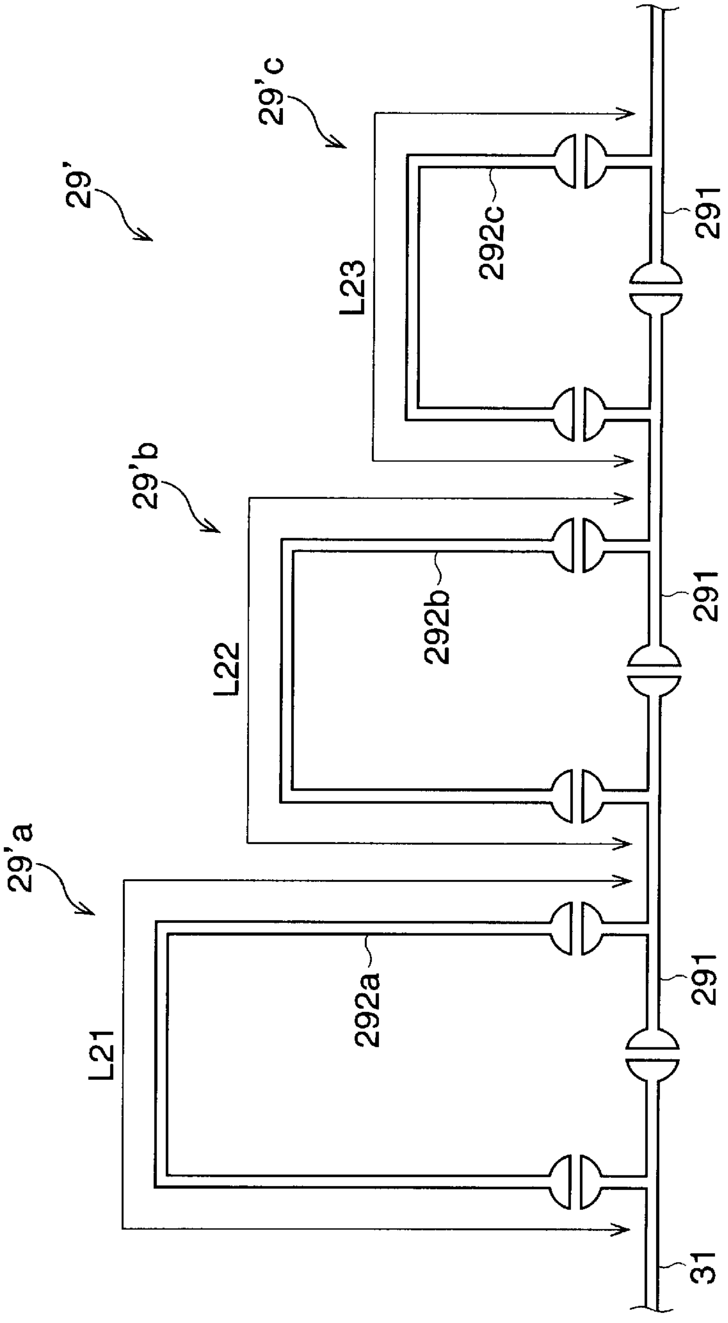
FIG. 6 is a view showing an inductance adjuster of the second embodiment.

FIG. 6 is a view showing an inductance adjuster 29 of a second embodiment. The second embodiment is different from the first embodiment in that the wire-length of the bypass wire portion is different in each inductance selecting wire pattern element.

As shown in FIG. 6, the inductance adjuster 29' has first, second, and third inductance selecting wire pattern elements 29'*a*, 29'*b*, and 29'*c*. The wire-length of the bypass wire portion 292*a* "L21" is larger than that of the bypass wire portion 292*b* "L22", which is larger than that of the bypass wire portion 292*c* "L23". Accordingly, one wire-path is selected from $2^3=8$ wire-paths and is defined as a part of the wire 31. Namely, one total-length of wire 31 is selected from eight possible total-lengths of wire 31. Thus, the magnitude of inductance can be adjusted minutely.

Figure 7:
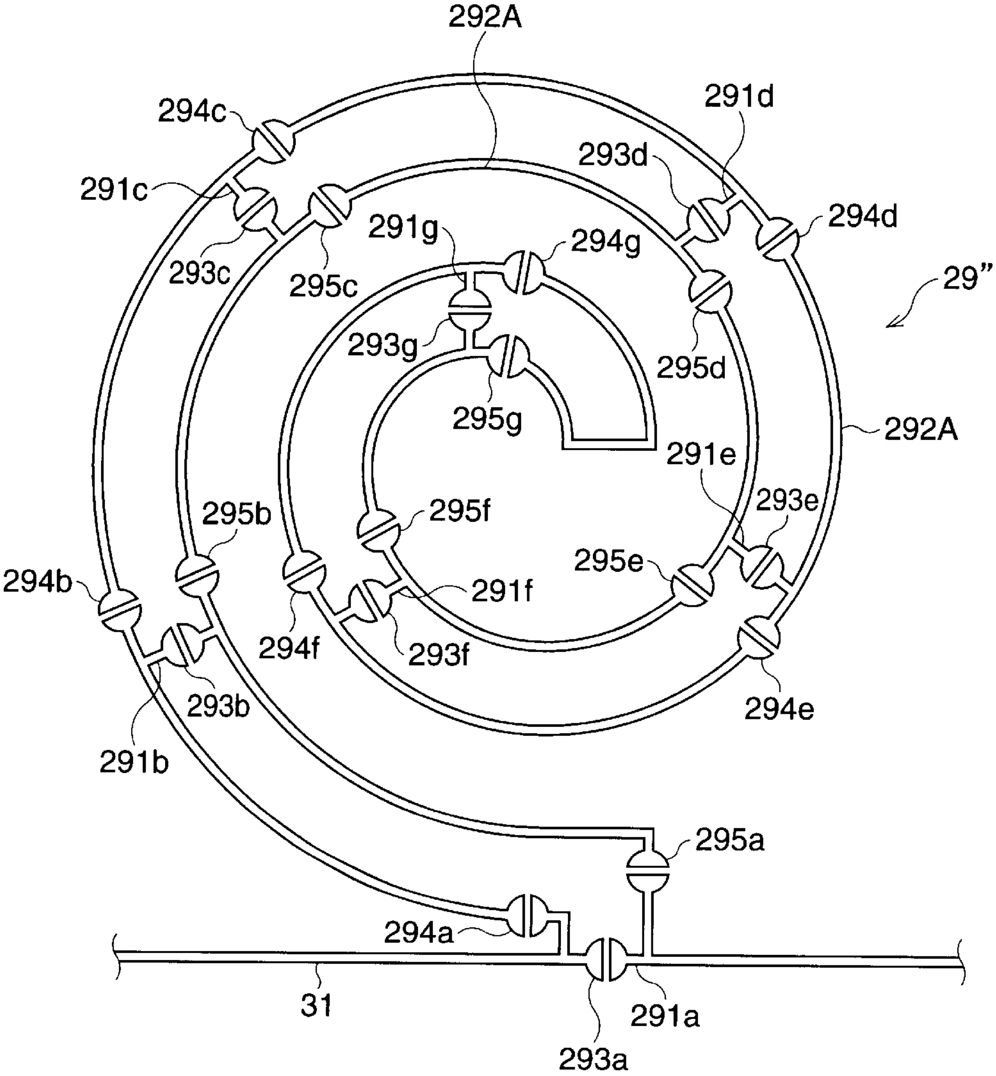
FIG. 7 is a view showing an inductance adjuster of the third embodiment.

FIG. 7 is a view showing an inductance adjuster of a third embodiment. The third embodiment is different from the first embodiment in that the wire-pattern in the inductance adjuster is formed in a spiral.

The inductance adjuster 29" has a bypass wire portion 292A and seven shorting wire portions 291*a* to 291*g*. The bypass wire portion 292A is formed in a spiral such that two wire lines extend and maintain a constant distance-interval. The shorting wire portions 291*a* to 291*g* are arranged between the two wire lines of the bypass wire portion 292A at constant intervals. The shorting lands 293*a* to 293*g* are formed at the center of the shorting wire portions 291*a* to 291*g* respectively. Seven pairs of bypass lands 294*a* and 295*a* to 294*g* and 295*g* are provided adjacent to the shorting wire portions 291*a* to 291*g* respectively.

When adjusting the magnitude of the inductance, firstly, one shorting wire portion is selected from the seven shorting wire portions 293*a* to 293*g*, and the shorting land provided at the selected shorting wire portion is bonded. Further, pairs of bypass lands, which are provided between the straight-shaped wire 31 and the selected shorting wire portion, are bonded. For example, when the shorting wire portion 293*c* is selected, the shorting land 293*c*, the pair of bypass lands 294*a* and 295*a*, and the pair of bypass lands 294*b* and 295*b* are bonded. Similarly to the first embodiment, the bonding is performed by soldering. The total-length of wire varies in accordance with the selected shorting wire portion, accordingly, the magnitude of inductance varies with the selected shorting wire portion.

In the third embodiment, as the inductance adjuster 29" is formed in a spiral, the total-length of the wire 31 can be lengthened even when the size of the PCB (printed circuit board) is relatively small. Therefore, a difference between the maximum magnitude of inductance and the minimum magnitude of inductance can be increased, and many shorting lands can be provided in the inductance adjuster. Consequently, the magnitude of inductance can be controlled minutely and the inductance adjuster will be compatible with any type of laser diode.

Note that, the bypass wire portion 292A may be formed in a rectangular shape in place of the spiral.

Figure 8:
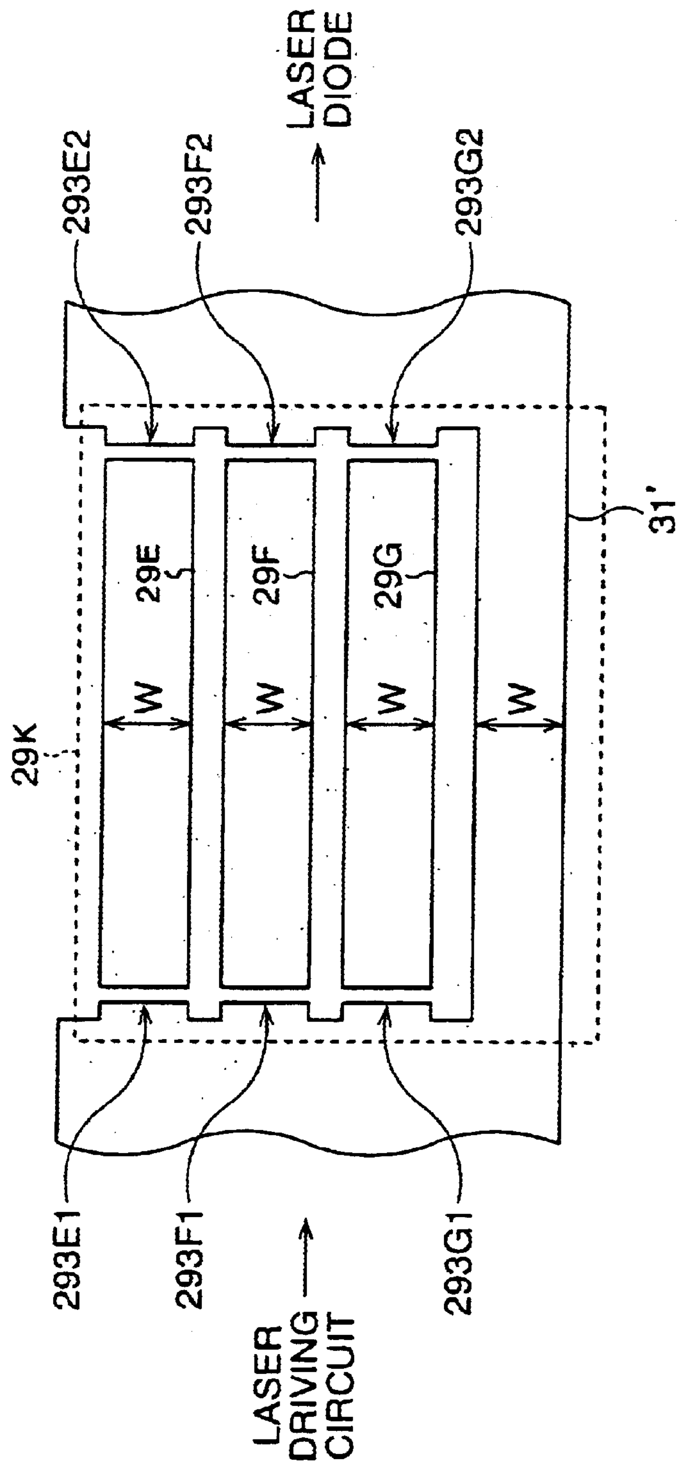
FIG. 8 is a view showing an impedance adjuster of the fourth embodiment.

FIG. 8 is a view showing an impedance adjuster of a fourth embodiment. The fourth embodiment is different from the first embodiment in that the width of the wire is selected in addition to the total-length of the wire. Namely, the magnitude of resistance varies with the width of the wire, so that the magnitude of impedance varies. The wire-pattern also varies with the selection of the width of the wire, therefore, the magnitude of impedance varies with the selected wire-pattern.

A wire 31' extends between the laser driving circuit 20 and the laser diode 11, and an impedance adjuster 29K is formed between the laser driving circuit 20 and the laser diode 11. Note that, the impedance adjuster 29 shown in the first embodiment is also provided on the way (herein not shown). The impedance adjuster 29K has three impedance selecting wire pattern elements 29E, 29F, and 29G, and three pairs of lands 293E1 and 293E2, 293F1 and 293F2, and 293G1 and 293G2, which are formed at the opposite sides of the three impedance selecting wire pattern elements 29E, 29F, and 29G, respectively.

The magnitude of impedance generally increases as the wire-width increases. Accordingly, when all of the three pairs of lands 293E1 and 293E2, 293F1 and 293F2, and 293G1 and 293G2 are not shorted, the magnitude of impedance becomes smallest. When one pair of lands among the three pairs of lands 293E1 and 293E2, 293F1 and 293F2, and 293G1 and 293G2 is selected and shorted, the width of the wire 31' becomes larger by width "W", consequently, the magnitude of impedance increases. When two pairs of lands among the three pairs of lands 293E1 and 293E2, 293F1 and 293F2, and 293G1 and 293G2 are selected and shorted, the width of the wire 31' becomes larger by width "2W", consequently, the magnitude of the impedance further increases. When three pairs of lands 293E1 and 293E2, 293F1 and 293F2, and 293G1 and 293G2 are selected and shorted, the width of the wire 31' becomes larger by width "3W", consequently, the magnitude of impedance increases further.

In this way, the width of the wire 31' is adjusted in addition to the total-length of the wire 31, thus the magnitude of impedance can be adjusted in more minute steps.

Figure 9:
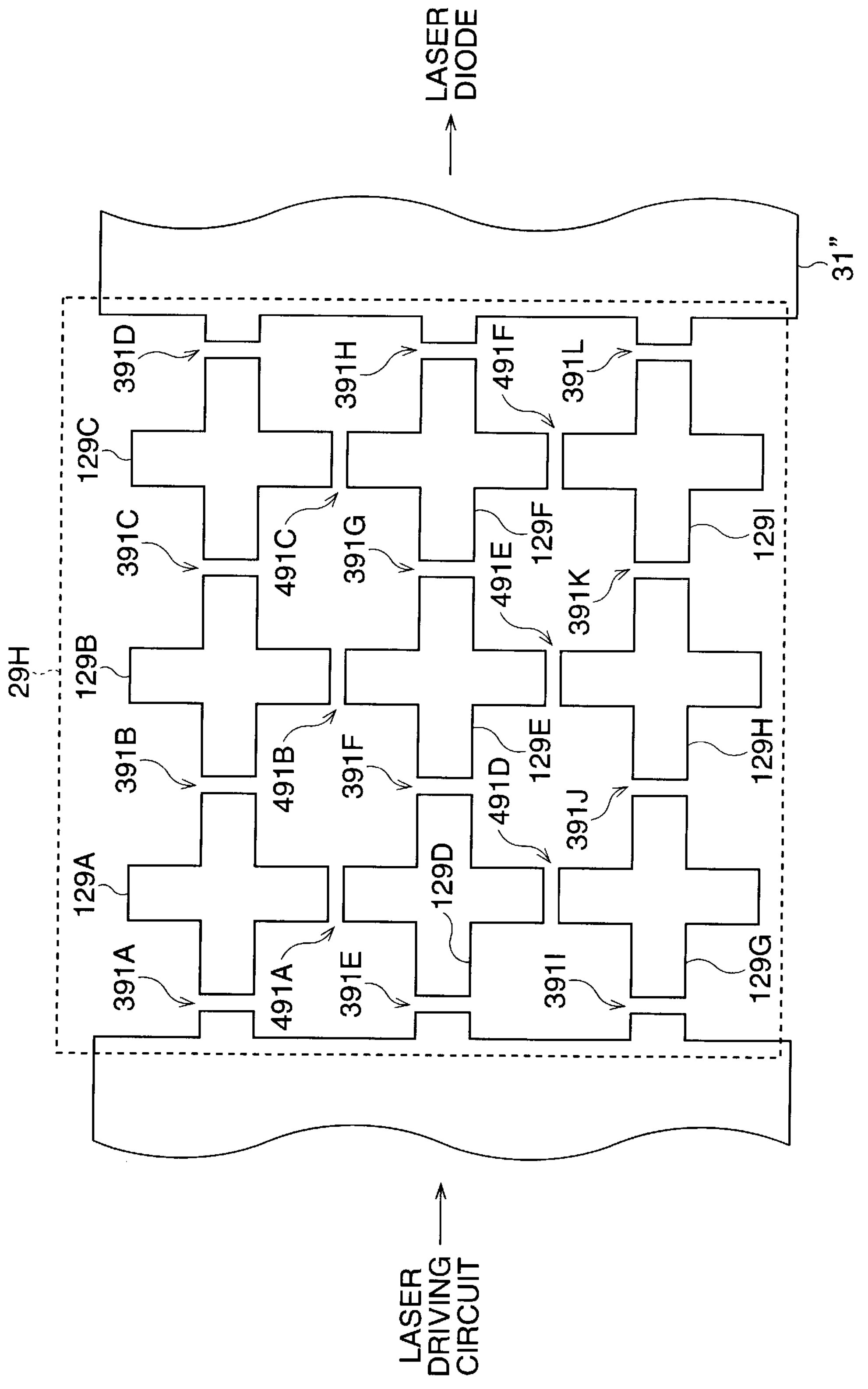
FIG. 9 is a view showing an impedance adjuster of the fifth embodiment.

FIG. 9 is a view showing an impedance adjuster of a fifth embodiment. The fifth embodiment is different from the first and fourth embodiments in that the width and length of the wire is adjusted within one impedance adjuster. Namely, the impedance (inductance and resistance) varies with the selection of wire-path in the impedance adjuster.

A wire 31" extends between the laser driving circuit 20 and the laser diode 11, and an impedance adjuster 29H is formed between the laser driving circuit 20 and the laser diode 11. The impedance adjuster has nine impedance selecting wire pattern elements 129A to 129I and has eighteen lands, which are composed of twelve lands 391A to 391L to be connected along the extending direction of the wire 31" and six lands 491A to 491F to be connected along a direction perpendicular to the extending direction. Each of the impedance selecting wire pattern elements 129A to 129I is cross-shaped and the nine pattern elements 129A to 129I are arranged in a matrix at constant intervals.

In the fifth embodiment, both the total-length of the wire 31" and the width of wire 31" is selected by the impedance adjuster 29H. When adjusting the total-length of wire 31", for example, the lands 391A, 491A, 491D, 391J, 391K, 491F, 491C, and 391D are selected and shorted respectively. On the other hand, when adjusting the width of the wire 31", for example, the lands 391A to 391L are selected and shorted.

Note that the "impedance" and "inductance" described above, indicate impedance and inductance during the transient state that occurs in the circuit because of the driving current.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No.2001-163798 (filed on May 31, 2001) which is expressly incorporated herein, by reference, in its entirety.

What is claimed is:

1. A semiconductor laser driving apparatus comprising:

a laser diode that emits a laser beam;

a laser driving circuit that drives said laser diode by feeding a driving current in pulses to said laser diode so that said laser diode emits said laser beam in pulses;

a conductor that conducts said driving current from said laser driving circuit to said laser diode; and an inductance adjuster that has a conductor-pattern for conducting said driving current and adjusting the magnitude of inductance in said conductor, wherein a part of said conductor-pattern that makes the magnitude of inductance a proper magnitude for emitting said laser beam in generally rectangular pulses, is selectively defined and conducts said driving current as a part of said conductor.

2. The semiconductor laser driving apparatus of claim 1, further comprising a printed circuit board, on which said laser diode and said laser driving circuit are provided, wherein said conductor is a wire and said conductor-pattern is a wire-pattern, said wire and said conductor-pattern being formed on said printed circuit board, a part of said wire-pattern conducting said driving current as a part of said wire.

3. The semiconductor laser driving apparatus of claim 2, wherein said wire-pattern is formed in such a manner that the total-length of said wire varies in accordance with the selection of said part of the wire-pattern.

4. The semiconductor laser driving apparatus of claim 2, wherein said wire-pattern is constructed by connecting a plurality of inductance selecting wire pattern elements in series, and each of said plurality of inductance selecting wire pattern elements includes:

a low-inductance wire portion that shortens the total-length of said wire so as not to increase the magnitude of inductance; and a bypass wire portion that lengthens said total-length by bypassing said low inductance wire portion so as to increase the magnitude of inductance, one of said low-inductance wire portion and said bypass wire portion being selectively defined in each of said plurality of inductance selecting wire pattern elements as a part of said wire.

5. The semiconductor laser driving apparatus of claim 4, wherein said low-inductance wire portion is formed in a straight line, and said bypass wire portion is formed in a rectangle.

6. The semiconductor laser driving apparatus of claim 4, wherein said low-inductance wire portion has a shorting terminal area, and said bypass wire portion has a pair of terminal areas arranged opposite to each other, one of said shorting terminal area and said pair of terminal areas is selected and electrically connected to conduct said driving current.

7. The semiconductor laser driving apparatus of claim 6, wherein said shorting terminal area is composed of a pair of pads arranged opposite to each other, and each of said pair of terminal areas is composed of a pair of pads arranged opposite to each other.

8. The semiconductor laser driving apparatus of claim 7, wherein said pair of terminal areas is provided adjacent to said shorting terminal area.

9. The semiconductor laser driving apparatus of claim 2, wherein said wire-pattern includes:

a single bypass wire portion that lengthens the total-length of said wire by bypassing so as to increase the magnitude of inductance; and a plurality of shorting wire portions that short said single bypass wire portion, said plurality of shorting wire portions are arranged in parallel between the long sides of said single bypass wire portion, one of said plurality of shorting wire portions being selected and electrically connected as a part of said wire.

10. The semiconductor laser driving apparatus of claim 9, wherein each of said plurality of shorting wire portions has a shorting terminal area, and said single bypass wire portion has plural pairs of terminal areas, each of said plural pairs of terminal areas being arranged opposite to each other and provided such that said plurality of shorting wire portions and said plural pairs of terminal areas are arranged alternately, and wherein one of said plurality of shorting wire portions is selected and the corresponding shorting terminal area is electrically connected, and the corresponding at least one pair of terminal areas is electrically connected.

11. The semiconductor laser driving apparatus of claim 10, wherein each of said plural pairs of terminal areas is provided adjacent to the opposite ends of the corresponding shorting wire portion.

12. The semiconductor laser driving apparatus of claim 9, wherein said single bypass wire portion is formed in a spiral.

13. A laser scanner comprising:

a laser diode that emits a laser beam;

a laser driving circuit that drives said laser diode by feeding a driving current in pulses to said laser diode so that said laser diode emits said laser beam in pulses;

a conductor that conducts said driving current from said laser driving circuit to said laser diode;

an inductance adjuster that has a conductor-pattern for conducting said driving current and adjusting the magnitude of inductance in said conductor; and a scanning optical system that deflects said laser beam and directs said laser beam to a photosensitive body for scanning, wherein a part of said conductor-pattern that makes the magnitude of inductance a proper magnitude for emitting said laser beam in generally rectangular pulses, is selectively defined and conducts said driving current as a part of said conductor.

14. A semiconductor laser driving apparatus comprising:

a laser diode that emits a laser beam;

a laser driving circuit that drives said laser diode by feeding a driving current in pulses to said laser diode so that said laser diode emits said laser beam in pulses;

a conductor that conducts said driving current from said laser driving circuit to said laser diode; and an impedance adjuster that has a conductor-pattern for conducting said driving current and adjusting the magnitude of impedance in said conductor, wherein a part of said conductor-pattern that makes the magnitude of impedance a proper magnitude for emitting said laser beam in generally rectangular pulses, is selectively defined and conducts said driving current as a part of said conductor.

15. The semiconductor laser driving apparatus of claim 14, further comprising a printed circuit board, on which said laser diode and said laser driving circuit are provided, wherein said conductor is a wire and said conductor-pattern is a wire-pattern, said wire and said conductor-pattern being formed on said printed circuit board, a part of said wire-pattern conducting said driving current as a part of said wire.

16. The semiconductor laser driving apparatus of claim 15, wherein said impedance adjuster is provided for adjusting the magnitude of impedance by changing at least one of the magnitude of inductance and the magnitude of resistance.

17. The semiconductor laser driving apparatus of claim 16, wherein said wire-pattern is formed in such a manner that at least one of the total-length of said wire and the width of said wire varies in accordance with the selection of said part of said wire-pattern.

18. The semiconductor laser driving apparatus of claim 17, wherein said wire-pattern has a plurality of line-shaped wire portions for changing the width of said wire, arranged parallel to each other, a part of said line-shaped wire portions is selected as a part of said wire.

19. The semiconductor laser driving apparatus of claim 18, wherein a pair of terminal areas is provided at opposite sides of each of said line-shaped wire portions.

20. The semiconductor laser driving apparatus of claim 17, wherein said wire-pattern has a plurality of cross-shaped wire portions for changing the width of said wire and the total-length of said wire, said plurality of cross-shaped wire portions being arranged in a matrix, a part of said plurality of cross-shaped wire portions is selected as a part of said wire.

21. The semiconductor laser driving apparatus of claim 20, wherein a plurality of terminal areas are provided between said plurality of cross-shaped wire portions.

22. A laser scanner comprising:

a laser diode that emits a laser beam;

a laser driving circuit that drives said laser diode by feeding a driving current in pulses to said laser diode so that said laser diode emits said laser beam in pulses;

a conductor that conducts said driving current from said laser driving circuit to said laser diode;

an impedance adjuster that has a conductor-pattern for conducting said driving current and adjusting the magnitude of impedance in said conductor; and a scanning optical system that deflects said laser beam and directs said laser beam to a photosensitive body for scanning, wherein a part of said conductor-pattern that makes the magnitude of impedance a proper magnitude for emitting said laser beam in generally rectangular pulses, is selectively defined and conducts said driving current as a part of said conductor.

* * * * *